US007234487B2

(12) United States Patent
Jacobson et al.

(10) Patent No.: US 7,234,487 B2
(45) Date of Patent: Jun. 26, 2007

(54) CROSS-OVER RELIEF VALVE ASSEMBLY FOR USE IN BI-DIRECTIONAL CIRCUIT

(75) Inventors: Robert D. Jacobson, St. Paul, MN (US); Nathan H. French, Prior Lake, MN (US); Tam C. Huynh, Richfield, MN (US); Christopher M. Lodermeier, Waverly, MN (US); Brian W. Behm, Cypress, TX (US)

(73) Assignee: Eaton Corporation, Cleveland, OH (US)

( * ) Notice: Subject to any disclaimer, the term of this patent is extended or adjusted under 35 U.S.C. 154(b) by 281 days.

(21) Appl. No.: 11/091,187

(22) Filed: Mar. 28, 2005

(65) Prior Publication Data

US 2006/0213562 A1 Sep. 28, 2006

(51) Int. Cl.
*F16K 17/18* (2006.01)
(52) U.S. Cl. ............. 137/493; 137/492.5; 137/493.2; 137/493.7
(58) Field of Classification Search ............. 137/493, 137/493.1, 493.2, 493.7, 492.5
See application file for complete search history.

(56) References Cited

U.S. PATENT DOCUMENTS

| | | | |
|---|---|---|---|
| 2,835,266 A * | 5/1958 | Morte | 137/493 |
| 3,145,723 A * | 8/1964 | Chorkey | 137/493.2 |
| 3,194,261 A | 7/1965 | Tennis | |
| 3,980,095 A | 9/1976 | McAvoy | |
| 4,625,756 A * | 12/1986 | Riedel et al. | 137/492.5 |
| 4,679,586 A * | 7/1987 | Riedel et al. | 137/492.5 |
| 5,036,877 A * | 8/1991 | Distler et al. | 137/492.5 |
| 5,072,752 A * | 12/1991 | Kolchinsky | 137/493 |
| 5,765,590 A | 6/1998 | Kim et al. | |
| 5,826,612 A * | 10/1998 | Goates | 137/493 |

* cited by examiner

*Primary Examiner*—Stephen M. Hepperle
(74) *Attorney, Agent, or Firm*—Sonu N. Weaver; K. J. Kasper

(57) ABSTRACT

A relief valve assembly (27) for use with first (15) and second (21) conduits, one communicating high pressure. The assembly comprises a housing (29,33) defining first (45) and second (47) ports, and a poppet seat (49). A poppet member (43) and the housing define a spring chamber (55), and a spring (39) is disposed to bias the poppet member toward the seat. The poppet member defines a shuttle cavity (51), a shuttle passage (53) communicating from the cavity to the spring chamber, and the poppet defining a seat (57), and a fluid passage (61P) communicating with the first port, and a seat (59), and a second fluid passage (63) communicating with the second port. A shuttle valve assembly (71,73,75) is provided, whereby the fluid pressure in whichever of the ports is at lower pressure is communicated to the spring chamber and adds to the force of the biasing spring.

5 Claims, 4 Drawing Sheets

CROSS-OVER RELIEF VALVE ASSEMBLY FOR USE IN BI-DIRECTIONAL CIRCUIT

BACKGROUND OF THE DISCLOSURE

The present invention relates to cross-over relief valve assemblies, and more particularly, to such valve assemblies for use in "bi-directional" circuits, i.e., circuits in which either side of the circuit may comprise the high pressure side, and either side of the circuit may comprise the low pressure side.

As is now well known to those skilled in the art, the function of a cross-over relief valve assembly is to protect a hydraulic circuit, and the various hydraulic components which comprise the circuit, from excessive pressure spikes or pulses which may, periodically, be present on the high pressure side of the circuit. Such protection of the circuit is achieved by providing a cross-over relief valve assembly which is designed to relieve (drain) the excessive pressure from the high pressure side of the circuit to the low pressure side of the circuit, whenever the fluid pressure in the high pressure side of the circuit exceeds a predetermined, pressure relief setting.

Although the cross-over relief valve assembly of the present invention may be utilized advantageously in many different types of hydraulic circuits and with many different types of fluid pressure operated devices, the invention is especially advantageous when utilized in a closed-loop hydrostatic circuit, including a hydraulic motor, and the invention will be described in connection therewith. Furthermore, the cross-over relief valve assembly of the present invention is especially beneficial when utilized in a hydrostatic circuit in which each side of the hydrostatic loop may switch fairly frequently between high pressure and low pressure.

In certain, prior art, cross-over relief valve arrangements, there has been provided a relief poppet having approximately half of its area subjected to the fluid pressure in the "A" side of the loop, and the remainder of its area subjected to the "B" side of the loop. In such an arrangement, if either side of the loop ("A" or "B") exceeds the predetermined pressure relief setting, the poppet would open and relieve fluid to the other (low pressure) side of the loop. However, the above-described arrangement is based on the assumption that the low pressure side of the loop will always remain at substantially zero pressure (i.e., reservoir pressure). If the hydrostatic loop in which the above-described arrangement is being utilized is subjected to a back pressure (i.e., a pressure above atmospheric on the low pressure side of the loop), such an elevated "low pressure" will assist the system high pressure in biasing the relief poppet toward an open position, thus effectively reducing the pressure relief setting and causing the cross-over relief valve to open at a pressure less than the predetermined, maximum relief setting.

Also, it has been common in hydrostatic circuits utilizing a motor to provide a pair of fairly conventional cross-over relief valves, one being operable to communicate the "A" side of the loop to the "B" side, and the other being operable to communicate the "B" side of the loop to the "A" side. Although such a dual cross-over relief valve arrangement is functionally acceptable, the addition of one more expensive relief valve can make the overall hydrostatic circuit economically undesirable. The duplication of relief valve assemblies can also complicate the packaging of the circuit.

BRIEF SUMMARY OF THE INVENTION

Accordingly, it is an object of the present invention to provide an improved cross-over relief valve assembly for use in a hydrostatic circuit which eliminates the undesirable effect of having a back pressure, greater than atmospheric pressure, on the low pressure side of the loop.

It is a more specific object of the present invention to provide such an improved cross-over relief valve assembly, for use on a bi-directional hydrostatic circuit, in which a back pressure on the low pressure side of the loop does not have any effect upon the predetermined pressure relief setting.

It is a further object of the present invention to provide such an improved cross-over relief valve assembly, which achieves the above-stated objects, and which is able, with an increasing back pressure in the hydrostatic loop, to maintain a predetermined, desired maximum pressure differential across the hydrostatic loop.

The above and other objects of the invention are accomplished by the provision of an improved cross-over relief assembly adapted for use in conjunction with first and second fluid conduits, communicating between a source of pressurized fluid and a fluid pressure operated device. Either of the first and second fluid conduits is operable to communicate relatively high pressure, and the other to communicate relatively low pressure. The cross-over relief valve assembly comprises a housing defining a first port adapted for fluid communication with the first fluid conduit, and a second port adapted for fluid communication with the second fluid conduit. The housing further defines a poppet seat, disposed between the first and second ports, and a poppet member. The housing and the poppet member cooperate to define a spring chamber, and a biasing spring is disposed in the spring chamber and is operable to bias the poppet number towards sealing engagement with the poppet seat, to prevent substantial fluid flow between the first and second ports.

The improved cross-over relief valve assembly is characterized by the poppet member defining a shuttle cavity and a shuttle passage providing fluid communication from the shuttle cavity to the spring chamber. The poppet member further defines a first shuttle seat at a first end of the shuttle cavity and a first fluid passage in fluid communication with the first port, and a second shuttle seat at the second end of the shuttle cavity, and a second fluid passage in fluid communication with the second port. A shuttle valve assembly is operably associated with the shuttle cavity and with the first and second shuttle seats, whereby the fluid pressure in whichever of the first and second ports is at lower pressure is communicated to the spring chamber and adds to the force of the biasing spring.

DETAILED DESCRIPTION OF THE PREFERRED EMBODIMENT

Figure 1:
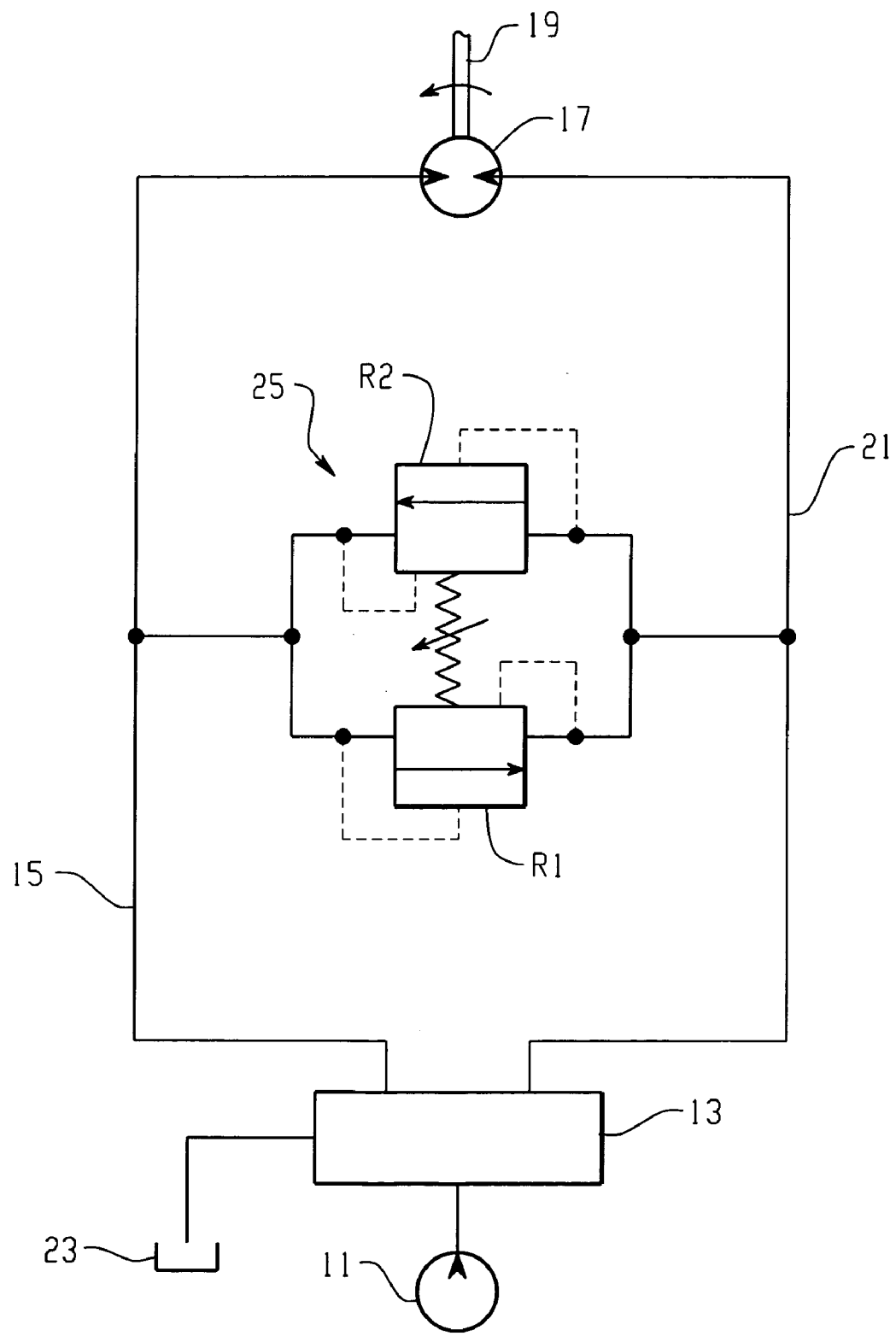
FIG. 1 is a simplified hydraulic schematic of a hydrostatic circuit of the type with which the present invention may be utilized, and which includes, schematically, one of the conventional, known, cross-over relief valve arrangements.

Referring now to the drawings, which are not intended to limit the invention, FIG. 1 is a simplified hydraulic schematic of one particular hydraulic (hydrostatic) circuit of the type in which the cross-over relief valve assembly of the present invention would be utilized. In the hydrostatic circuit of FIG. 1, there is shown a pump 11 which comprises the source of pressurized fluid for the circuit, with the output of the pump 11 being communicated to a control valve assembly 13 having two further ports, either of which can be an inlet and either of which can be an outlet. One of the ports of the control valve assembly 13 is connected to a conduit 15, which in turn, is connected to a port of a motor 17. Pressurized fluid in the conduit 15 drives the motor 17 in a direction to rotate an output shaft 19 in the direction shown (see arrow).

The other port of the motor 17 is connected to a conduit 21 which, in turn, is connected to the opposite port of the control valve assembly 13. An outlet or return port of the control valve assembly 13 is connected to a system reservoir 23. Although not shown, those skilled in the art will understand that the pump 11 would also typically have its inlet in communication with the reservoir 23. Those skilled in the art of hydrostatic circuits will also understand that FIG. 1 is shown merely by way of example of one of the possible environments for the invention. The circuit configuration could vary substantially, as could the various components of the circuit, all of which variations are included within the present invention, insofar as they come within the scope of the appended claims.

Although FIG. 1 illustrates a "closed loop" hydrostatic circuit, those skilled in the art will understand that the invention is not so limited, but instead, could be utilized in any hydrostatic loop wherein each side of the loop can, at various times, comprise the high pressure side, and at various other times, can comprise the low pressure side.

Referring still primarily to FIG. 1, there is illustrated, in schematic form only, a cross-over relief arrangement, generally designated 25, which is included herein primarily to illustrate the cross-over relief function, within the overall hydrostatic circuit, and also to show one of the well-known prior art arrangements in which there would be two separate relief valve assembles R1 and R2, with relief valve assembly R1 relieving from conduit 15 to conduit 21 (when pressure would be excessive in conduit 15), and the relief valve assembly R2 relieving from conduit 21 to conduit 15 (when pressure would be excessive in the conduit 21).

Figure 2:
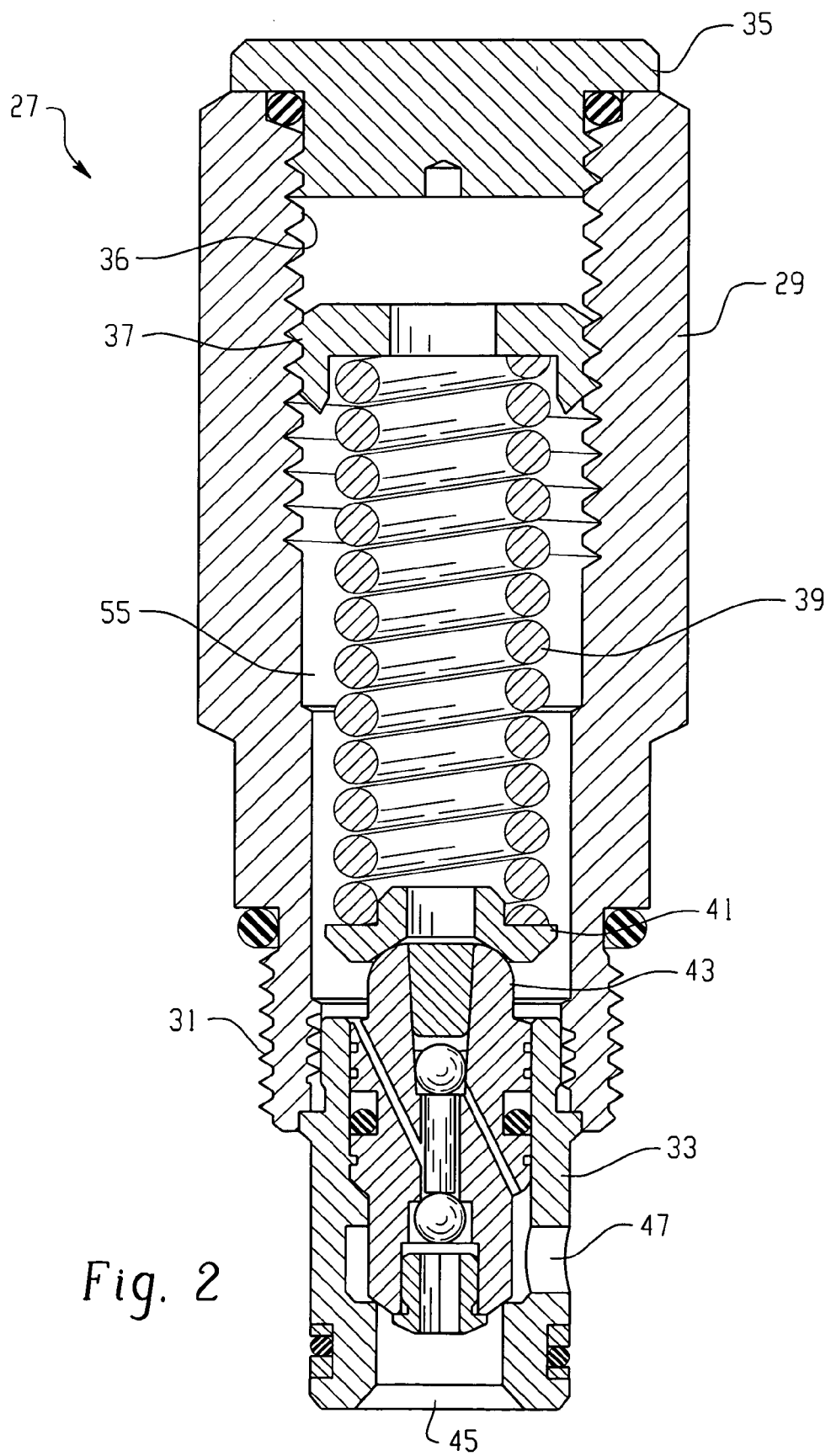
FIG. 2 is an axial cross-section of one embodiment of a cross-over relief valve assembly made in accordance with the teachings of the present invention.

Referring now primarily to FIG. 2, in conjunction with FIG. 1, the cross-over relief arrangement 25 of FIG. 1 is replaced by a cross-over relief valve assembly, generally designated 27, made in accordance with the present invention. The cross-over relief valve assembly 27 comprises a valve housing which, in the subject embodiment, and by way of example only, comprises a generally cylindrical cartridge member 29 defining a set of external threads 31, such that valve assembly 27 may be threaded into fluid-tight sealing engagement with a manifold, or a valve block, or a pump housing, or some other structure which forms part of the hydrostatic circuit. The housing of the valve assembly 27 further includes a cage member 33 which is in threaded engagement with the cartridge member 29, to be in fixed engagement relative thereto.

In threaded engagement with an upper, open end of the cartridge member 29 is a threaded plug 35, in threaded engagement with a set of internal threads 36 formed within the cartridge member 29. Disposed somewhat below the threaded plug 35, and also in threaded engagement with the internal threads 36 is a spring seat member 37, which is adjustable axially (up and down in FIG. 2) relative to the cartridge member 29. Seated against an undersurface of the spring seat member 37 is a compression spring 39, the lower end of the compression spring 39 being seated against a spring seat member 41. The spring seat member 41 is disposed in engagement with an upper (in FIG. 2) end of a relief poppet member, generally designated 43.

Figure 3:
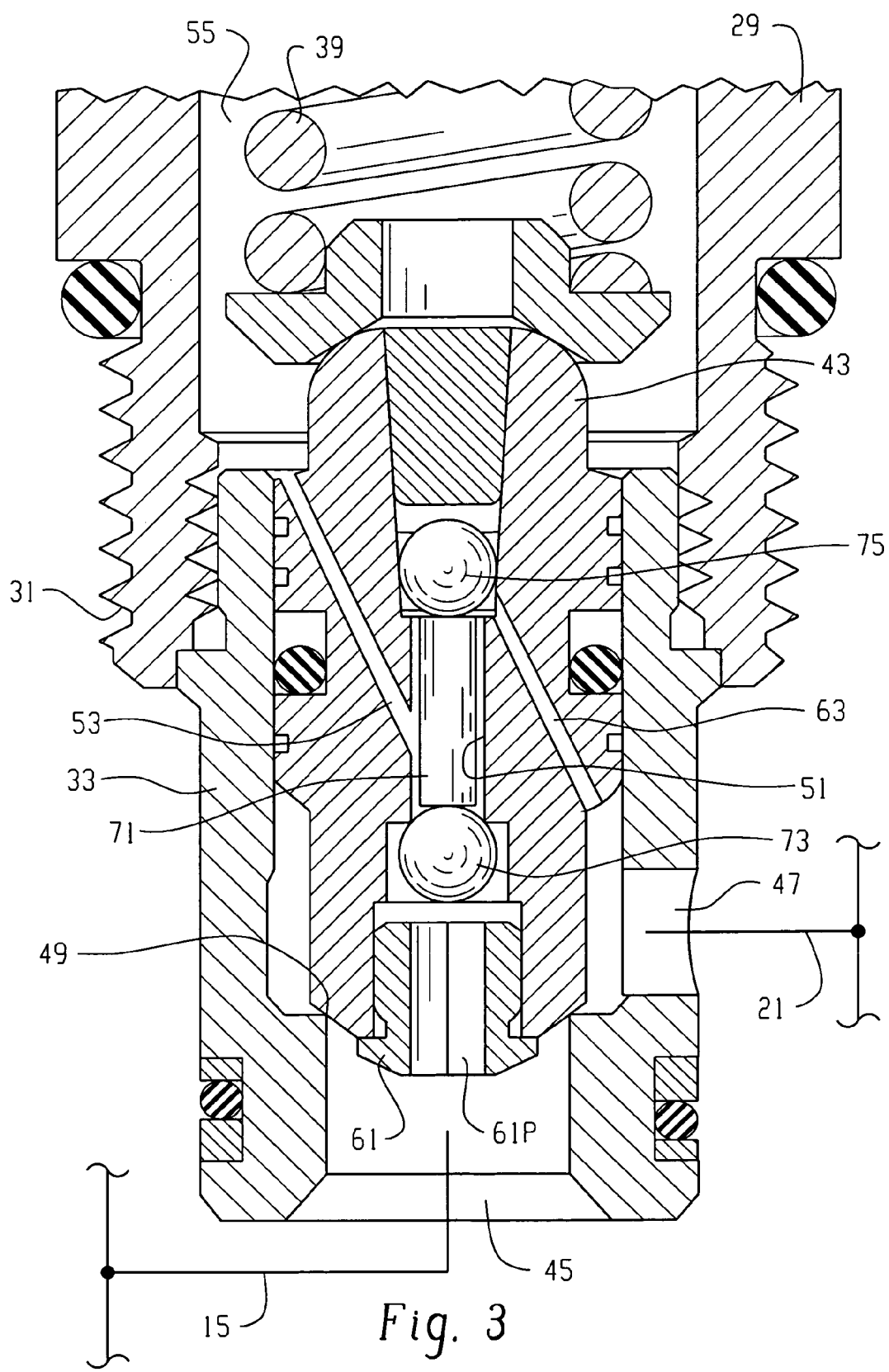
FIG. 3 is an enlarged, fragmentary, axial cross-section of the cross-over relief valve assembly shown in FIG. 2, showing primarily only the shuttle arrangement which comprises the main aspect of the present invention.

The cage member 33 defines a fluid port 45 and a fluid port 47, and as may best be seen by referring to FIGS. 1 and 3 in conjunction with FIG. 2, the fluid port 45 is in open fluid communication with the conduit 15 (the "A" side of the loop), while the fluid port 47 is in fluid communication with the conduit 21 (the "B" side of the loop). The cage member 33 also defines a poppet seat 49, and as may best be seen in FIG. 2, the compression spring 39 biases the relief poppet member 43 into sealing engagement with the poppet seat 49, thus preventing fluid communication between the fluid ports 45 and 47. Thus, FIGS. 2 and 3 both illustrate the normal "closed" condition of the cross-over relief valve assembly 27.

Referring now primarily to FIG. 3, the relief poppet member 43 includes an elongated shuttle cavity 51, and in fluid communication with the shuttle cavity 51 is a shuttle passage 53 which is open fluid communication with a spring chamber 55 (see also FIG. 2), defined by the cartridge member 29, and having the compression spring 39 disposed therein.

Figure 4:
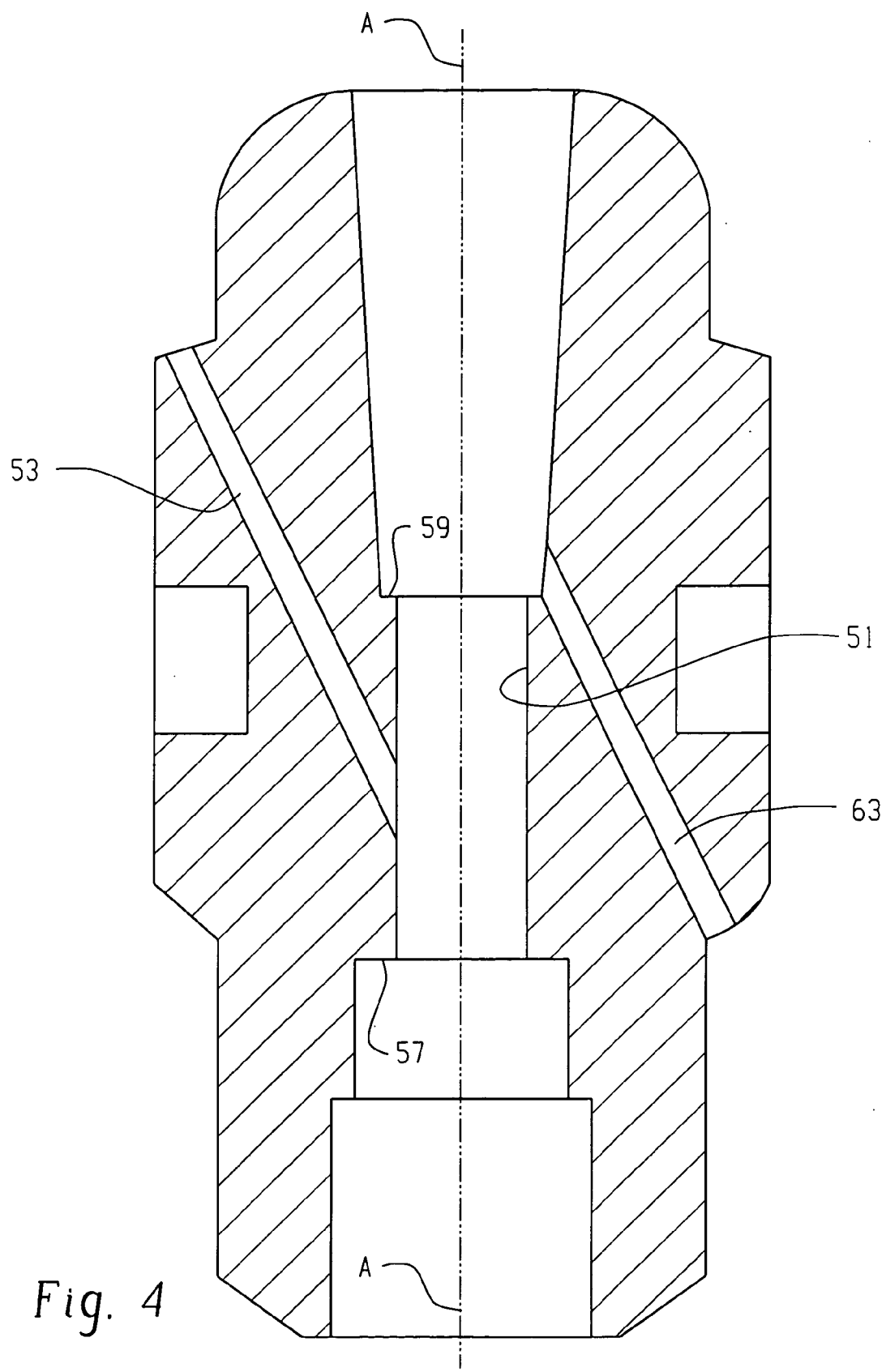
FIG. 4 is an axial cross-section of the relief poppet member alone, similar to the view of FIG. 3, and on about the same scale, to facilitate description of the relief poppet member.

As may best be seen in FIG. 4 which shows only the relief poppet member 43, for ease of illustration, at one end of the shuttle cavity 51, the poppet member 43 defines a first shuttle seat 57, and at the axially opposite end of the shuttle cavity 51, the poppet member 43 defines a second shuttle seat 59. Referring again also to FIG. 3, disposed within a lower end of the relief poppet member 43 is a retainer member 61, the central portion of which is open, to form a fluid passage 61P, such that the region adjacent the first shuttle seat 57 is in open fluid communication with the fluid port 45. The relief poppet member 43 also defines a fluid passage 63, such that the region adjacent the second shuttle seat 59 is in open fluid communication with the fluid port 47.

Referring again primarily to FIG. 3, associated with the relief poppet member 43 is a shuttle valve assembly which comprises the following additional components. Disposed within the shuttle cavity 51 is an elongated spacer member 71, which is moveable axially (up and down in FIG. 3, and along an axis A shown in FIG. 4) within the shuttle cavity 51. Operably associated with the first shuttle seat 57 is a first shuttle ball 73, and operably associated with the second shuttle seat 59 is a second shuttle ball 75, the shuttle balls 73 and 75 also being referred to hereinafter in the appended claims as "shuttle poppets". As is common in the shuttle valve art, the spacer member 71 is selected, in terms of its length relative to the axial length of the shuttle cavity 51, such that either the first shuttle ball 73 is lifted off its seat 57, or the second shuttle ball 75 is lifted of its seat 59. Which shuttle ball is seated and which is lifted from its seat is a function of which shuttle seat (57 or 59) "sees" high pressure. Assuming now, by way of example only, that the "A" side of the hydrostatic loop, i.e., the conduit 15, contains high pressure, it may be seen that the high pressure fluid in the conduit 15 is present in the fluid port 45, and in the passage 61P, thus biasing the first shuttle ball 73 to the position shown, seated against the first shuttle seat 57.

In operation, and under normal operating conditions, with high pressure in the conduit 15, the cross-over relief valve assembly 27 of the present invention will remain in its closed position as shown in FIGS. 2 and 3, as long as the pressure in the conduit 15 remains at or below the predetermined pressure relief setting. For purposes of illustration only, and not by way of limitation, it will be assumed that the compression spring 39 has been selected to provide a predetermined pressure relief setting of 4000 psi. (272 bar). Under normal operating conditions, with the conduit 21 containing fluid at substantially zero (reservoir) pressure, the predetermined pressure relief setting of 4000 psi. (272 bar) would permit the motor 17 to operate at a pressure differential of up to the 4000 psi. (272 bar) at which the cross-over relief valve assembly is set, thus achieving maximum output from the motor 17.

If, when utilizing the prior art cross-over relief arrangements, there were a back-pressure on the motor 17, which would manifest itself as a pressure in the conduit 21 substantially above (by way of example, 1000 psi. or 68 bar) reservoir pressure, the result would be that the relief valve would still open at a pressure of 4000 psi. (272 bar) in the conduit 15, but now, because of the back-pressure of 1000 psi. (68 bar) in the conduit 21, the typical prior art relief valve arrangement would open at a pressure differential across the motor 17 of only 3000 psi. (204 bar). That would be true, for example, in the case of the prior art relief valves in which both the "A" side and "B" side pressures exert an opening force on the relief poppet at the same time.

In the operation of the present invention, with the same pressures assumed to be present in the conduits 15 (4000 psi., 272 bar) and 21 (1000 psi., 68 bar), fluid pressure in the conduit 21 would also be present in the fluid port 47, and therefore, also in the fluid passage 63, and in the region of the second shuttle seat 59 (see FIG. 4). With the high pressure in the conduit 15, and in the fluid passage 61P, holding the shuttle assembly in the position shown in FIG. 3, as explained previously, the fluid pressure in the region of the second shuttle seat 59 is communicated into the space between the shuttle cavity 51 and the spacer member 71, so that the elevated "low" pressure (1000 psi., 68 bar in the example) is communicated through the shuttle passage 53, and into the spring chamber 55. Thus, the elevated low pressure in the spring chamber 55 is added to the normal biasing force of the compression spring 39 (equivalent to 4000 psi., 272 bar), so that the total force acting on the relief poppet member 43 is now the equivalent of 5000 psi. (340 bar). Therefore, the relief poppet member 43 will not open (i.e., be lifted off its poppet seat 49) until the fluid pressure in the conduit 15 reaches 5000 psi. (340 bar), but with the back-pressure of 1000 psi. (68 bar) present in the conduit 21, the motor 17 is still able to be operated at its maximum, desired output, i.e., at the same 4000 psi. (272 bar) pressure differential.

Assuming now, for illustration purposes, that the conduit 21 ("B" side of the loop) contains the 4000 psi. (272 bar), and the conduit 15 ("A" side of the loop) contains the 1000 psi. (68 bar), the operation will be reversed from what has just been described. With the high pressure in the conduit 21, there will also be the same high pressure in the fluid passage 63 and in the region around the second shuttle seat 59, thus seating the second shuttle ball 75 against the second shuttle seat 59, and biasing the shuttle assembly downward from the position shown in FIG. 3 to its "opposite" position in which the first shuttle ball 73 is lifted off the first shuttle seat 57. With the shuttle assembly in the position just described, the low pressure (1000 psi., 68 bar) in the conduit 15 is communicated past the first shuttle ball 73 and into the space between the shuttle cavity 51 and the spacer member 71, then through the shuttle passage 53, and into the spring chamber 55. Therefore, as described previously, the low pressure is added to the spring force, such that the relief poppet member 43 is again biased toward its closed position by a force equivalent to 5000 psi. (340 bar).

In describing the operation of the present invention, reference has been made to a "space" between the shuttle cavity 51 and the spacer member 71, and it should be understood by those skilled in the hydraulic valve art that this space could take many forms, all of which are within the scope of the invention. For example, both the shuttle cavity 51 and the spacer member 71 could have circular cross-sections but with that of the spacer member 71 being of a somewhat smaller diameter. Alternatively, the spacer member 71 could define one or more flats, or could have a configuration such as hexagonal to define fluid passages between the shuttle cavity 51 and the spacer member 71. All that is essential to the practice of the invention is that, for any position of the spacer member 71 within the shuttle cavity 51, low pressure must be able to be communicated from whichever region contains low pressure (near shuttle seat 57, or near shuttle seat 59) to the shuttle passage 53.

Although the shuttle valve assembly has been illustrated and described herein as comprising spacer member 71 and shuttle balls 73 and 75, as separate, loose items, those skilled in the art will understand that, upon assembly of the valve assembly 27, these items could be rigidly attached to each other. For example, the spacer member 71 could be thinner and have opposite, threaded ends, and the balls could have internally-threaded openings to receive the threaded ends of the spacer member 71

Thus, the present invention provides an improved cross-over relief valve assembly 27, for use on a bi-directional hydrostatic circuit, in which a back-pressure on the low pressure side of the hydrostatic loop does not have any effect upon the predetermined pressure relief setting, i.e., the fluid pressure operated device of the circuit still sees the same pressure differential across the device (the motor 17 herein).

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

The invention claimed is:

1. A cross-over relief valve assembly adapted for use in conjunction with first and second fluid conduits, communicating between a source of pressurized fluid and a fluid pressure operated device, either of said first and second fluid conduits being operable to communicate relatively high pressure, and the other communicating relatively low pressure; said cross-over relief valve assembly comprising a housing defining a first port adapted for fluid communication with said first fluid conduit, and a second port adapted for fluid communication with said second fluid conduit; said housing further defining a poppet seat, disposed between said first and second ports, and a poppet member; said housing and said poppet member cooperating to define a spring chamber, and a biasing spring disposed in said spring chamber and being operable to bias said poppet member toward sealing engagement with said poppet seat to prevent substantial fluid flow between said first and second ports; characterized by:
  (a) said poppet member defining a shuttle cavity and a shuttle passage providing fluid communication from said shuttle cavity to said spring chamber;
  (b) said poppet member further defining a first shuttle seat at a first end of said shuttle cavity, and a first fluid passage in fluid communication with said first port, and a second shuttle seat at a second end of said shuttle cavity, and a second fluid passage in fluid communication with said second port; and
  (c) a shuttle valve assembly operably associated with said shuttle cavity and with said first and second shuttle seats, whereby the fluid pressure in whichever of said first and second ports is at lower pressure is communicated to said spring chamber and adds to the force of said biasing spring.

2. A cross-over relief valve assembly as claimed in claim 1, characterized by said fluid pressure operated device comprises a bi-directional hydraulic motor intended to be able to operate at a predetermined maximum pressure differential across said hydraulic motor.

3. A cross-over relief valve assembly as claimed in claim 1, characterized by said poppet member defining an axis as said poppet member moves between a closed position and an open position, permitting fluid communication between said first port and said second port, said shuttle cavity having said axis passing therethrough.

4. A cross-over relief valve assembly as claimed in claim 1, characterized by said shuttle valve assembly comprises a first shuttle poppet operably associated with said first shuttle seat, a second shuttle poppet operably associated with said second shuttle seat, and a spacer member disposed within said shuttle cavity and normally in engagement with both of said first and second shuttle poppets.

5. A cross-over relief valve assembly as claimed in claim 4, characterized by said spacer member being selected, relative to said shuttle cavity, such that, whenever one of said first and second shuttle poppets is seated against its respective shuttle seat, said spacer member holds the other of said first and second shuttle poppets off of its respective shuttle seat.

* * * * *